United States Patent Office 3,403,161
Patented Sept. 24, 1968

3,403,161
[2-(2-AMINO-LOWER ALKYL-AMINO)-5-SUBSTITUTED BENZOYL]-PYRIDINE
Rodney Ian Fryer, North Caldwell, Robert August Schmidt, Wallington, and Leo Henryk Sternbach, Upper Montclair, N.J., assignors to Hoffmann-La Roche Inc., Nutley, N.J., a corporation of New Jersey
No Drawing. Continuation-in-part of application Ser. No. 358,613, Apr. 9, 1964. This application Apr. 15, 1965, Ser. No. 448,259
3 Claims. (Cl. 260—296)

ABSTRACT OF THE DISCLOSURE

[2-(2-amino-lower alkyl-amino)-5-substituted benzoyl] pyridine, intermediates convertible into 5-pyridyl-2,3-dihydro - 1,4-benzodiazepines. The last-mentioned compounds are useful for pharmacological purposes, e.g. as sedatives, anticonvulsants and muscle relaxants.

RELATED CASES

This application is a continuation-in-part of Ser. No. 358,613, filed Apr. 9, 1964, which has matured into Patent No. 3,182,607, on May 4, 1965.

This application relates to a group of novel medicinally valuable pyridine compounds and intermediates therefor. The novel medicinally acceptable pyridine compounds of this invention are benzodiazepine compounds directly joined in the 5-position to a cyclic carbon atom of the pyridine nucleus. More particularly, the novel medicinally valuable compounds of the invention are selected from the group consisting of 7-$R_4$-2,3-dihydro-5-pyridyl-1-$R_1$-3-$R_3$-1H-1,4-benzodiazepine and acid addition salts thereof; wherein $R_1$ and $R_3$ are each selected from the group consisting of hydrogen and lower alkyl and $R_4$ is selected from the group consisting of hydrogen, halogen, nitro, cyano and trifluoromethyl.

The compounds referred to above as 7-$R_4$-2,3-dihydro-5-pyridyl-1-$R_1$-3-$R_3$-1H-1,4-benzodiazepine are of the formula

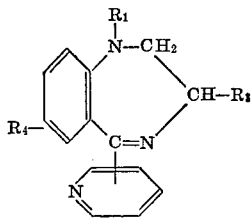

I wherein $R_1$ and $R_3$ are selected from the group consisting of lower alkyl and hydrogen and $R_4$ is selected from the group consisting of hydrogen, halogen, nitro, trifluoromethyl and cyano.

Compounds of Formula I above can be prepared by a process which involves reacting a compound of the formula

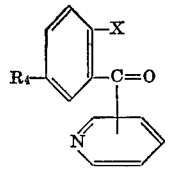

II wherein $R_4$ is as above and X is halogen, i.e. chlorine, fluorine, bromine and iodine, with an alkylene-1,2-diamine of the formula

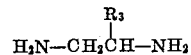

III wherein $R_3$ has the same meaning as above.

The process can either proceed directly to compounds of Formula I above or through intermediates of the formula

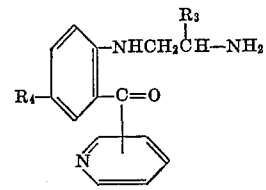

IV wherein $R_3$ and $R_4$ have the same meaning as in Formula I above which are then cyclized with or without isolating the same from the reaction medium in which they are prepared to compounds of Formula I above.

In a preferred embodiment, elevated temperatures are utilized when effecting the conversion of compounds of Formula II above to compounds of Formula I above via the reaction thereof with an alkylene-1,2-diamine of the Formula III above, e.g., at an elevated temperature above about 75° C. Representative of alkylene-1,2-diamines suitable for the purposes of the present invention is, for example, ethylenediamine. The alkylene-1,2-diamine utilized can be present in excessive amounts whereby it serves per se as the reaction media. In an alternative procedure, a convention inert organic solvent such as a lower alkanol or a tertiary amine such as pyridine, picoline, quinoline and the like can be used as the reaction media. A preferred embodiment of the last-mentioned process aspect of the present invention comprises reacting a (2-halobenzoyl)pyridine, advantageously, a (2-chlorobenzoyl) pyridine with ethylenediamine.

The intermediates of Formula IV above are novel and are useful in the preparation of compounds of Formula I above. Also certain of the intermediates of Formula II above are novel.

Compounds of Formula II above can be prepared by reacting a pyridyl Grignard reagent, e.g. pyridyl lithium or pyridyl magnesium halide, with a 2-halobenzonitrile, e.g., a compound of the formula

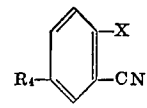

wherein $R_4$ and X are as above, or by converting an ortho-halo-halobenzene to the Grignard reagent and reacting the so-formed reagent with cyano pyridine. Compounds of Formula II above can also be prepared by oxidizing a compound of the formula

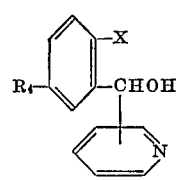

wherein $R_4$ and X are as above with a conventional oxidizing agent which may be chromic acid and the like. Compounds of Formula II above wherein $R_4$ is nitro may be prepared from the corresponding compound wherein $R_4$ is hydrogen by treatment thereof with nitric acid in the presence of a mineral acid such as sulfuric acid. Compounds of Formula II above wherein $R_4$ is nitro can be converted, if desired, to the corresponding compound of Formula II above wherein $R_4$ is halogen or cyano by the techniques described hereinbelow in connection with the corresponding conversion of compounds of Formula I above wherein $R_4$ is nitro.

Compounds of Formula I above wherein $R_4$ is nitro can be reduced by conventional techniques, i.e., hydrogenation in the presence of Raney nickel to form the corresponding compound wherein $R_4$ is amino. The resultant compound wherein $R_4$ is amino, if desired, can be selectively converted into the corresponding compound wherein $R_4$ is halogen or cyano by treatment thereof with nitrous acid in the presence of a mineral acid, e.g., hydrochloric acid, followed by the treatment of the resulting substance with a strong hydrohalic acid, e.g., hydrochloric acid in the presence of a copper catalyst, e.g., cuprous chloride in the case where a compound of Formula I above wherein $R_4$ is halogen is desired, and cuprous cyanide in the case where a compound of Formula I above wherein $R_4$ is cyano is desired.

Compounds of Formula II above can be utilized to prepare (2-amino-5-substituted-benzoyl)-pyridine intermediates of the formula

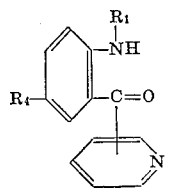

wherein $R_1$ is selected from the group consisting of hydrogen and lower alkyl and $R_4$ is selected from the group consisting of halogen, trifluoromethyl, nitro and cyano by a process which involves treating compounds of Formula II above wherein $R_4$ is selected from the group consisting of halogen, trifluoromethyl, nitro and cyano with ammonia or a primary lower alkyl amine, e.g. methylamine, in the presence of a suitable solvent such as water, a lower alkanol such as ethanol and propanol or an ether such as dioxane and the like. Preferably, the reaction is effected at an elevated temperature, advantageously in the presence of a copper catalyst such as cuprous chloride.

The following examples are illustrative but not limitative of both aspects of the present invention. All temperatures are stated in degrees centigrade, unless otherwise specified.

Example 1

To 100 ml. of 15% butyl lithium in hexane dissolved in 200 ml. of ether and cooled to —40°, 14.7 ml. of 2-bromopyridine in 60 ml. of ether was carefully added with stirring. After 15 min., 20.7 g. of o-chlorobenzonitrile in 75 ml. of ether was added to the reaction mixture while maintaining the temperature at —50°. After stirring for 1 hr., the reaction medium was allowed to warm to about 10°. It was then cooled in an ice bath and decomposed by the addition of 150 ml. of water and 100 ml. of 3 N hydrochloric acid. The organic layer was separated and re-extracted with 3 N hydrochloric acid. The combined acid layers were heated on a steam bath for 1 hr., cooled and neutralized with sodium hydroxide. The aqueous phase was extracted with ether and the ether layer washed with brine and dried over sodium sulfate. Ether was distilled off and the residue was converted to the hydrochloride with a solution of hydrogen chloride in methanol. The solvent was distilled off and the residue crystallized from acetonitrile to give 2-(2-chlorobenzoyl)pyridine hydrochloride, melting at 157–163°. The free base was then liberated and crystallized from hexane as colorless prisms to give 2-(2-chlorobenzoyl) pyridine melting at 52–54°.

The hydrochloride was recrystallized from acetonitrile and melted at 160–164°.

Example 2

To a solution of 42.8 g. of 2-(2-chlorophenyl) pyridylcarbinol in 300 ml. of acetic acid, there was carefully added a solution of 19.5 g. of chromic acid in 40 ml. of water. The temperature rose to 45° during ½ hr. The reaction was then heated to 60° for 2 hrs. The resultant solution was poured into 1.5 l. of cold water. The crystalline product that formed was filtered off and recrystallized from hexane to give 2-(2-chlorobenzoyl)-pyridine, M.P. 52–54°.

Example 3

A solution of 5.0 g. of 2-(2-chlorobenzoyl)pyridine in 25 ml. of concentrated sulfuric acid was cooled to 0°. A solution of 1.2 ml. of 90 percent nitric acid in 3 ml. of sulfuric acid was added slowly keeping the temperature at about 0°. After stirring for 1 hr. at 0°, the temperature was allowed to rise to about 20° during 1 hr. The solution was then added to ice and the mixture neutralized by the addition of ammonium hydroxide. The crystalline product was filtered and dried to give 2-(2-chloro-5-nitrobenzoyl)-pyridine, M.P. 135–137°. Recrystallization from cyclohexane or a mixture of benzene and hexane gave colorless rods melting at 137–138°.

Example 4

A solution of 125 ml. of butyl lithium (15 percent in hexane) in 250 ml. of ether was cooled to —50° and 18.2 ml. of 2-bromopyridine in 75 ml. of ether was added carefully while maintaining the temperature at —50°. After 15 min., a solution of 38.2 g. of 2-chloro-5-trifluoromethylbenzonitrile in 100 ml. of ether was carefully added. The cooling bath was then removed and the reaction stirred for 90 min. It was chilled to 0° and decomposed by the addition of 200 ml. of water followed by 150 ml. of 3 N hydrochloric acid. The aqueous phase was separated and the ether layer was diluted by the addition of 500 ml. of ether, washed with dilute sodium bicarbonate and dried over sodium sulfate. The residue obtained after distilling off the ether was crystallized from hexane to give 2-(2-chloro-5-trifluoromethylbenzoyl)pyridine, melting at 59–60°. Repeated crystallization from hexane gave colorless rhombs melting at 67–69°.

Example 5

A solution of 20 g. of 2-(2-chloro-5-trifluoromethylbenzoyl)pyridine in 200 ml. of pyridine and 50 ml. of ethylene diamine was refluxed for 5½ hrs. The mixture was concentrated to dryness in vacuo, and the residue partitioned between methylene chloride and dilute sodium carbonate. The organic layer was separated, washed with brine, and dried over sodium sulfate. The solvent was distilled off and the residue dissolved in 600 ml. of 1 N hydrochloric acid. A precipitate which formed was filtered off and the filtrate was made basic by the addition of ammonia. The aqueous solution was extracted with methylene chloride and the organic layer was dried over sodium sulfate. Distilling off the methylene chloride gave a residue which consisted mainly of 2-[2-(2-aminoethylamino) - 5-trifluoromethylbenzoyl]pyridine. The residue was dissolved in 500 ml. of toluene and the resultant solution refluxed for 3 hrs. while distilling off water azeotropically. Toluene was distilled off and the residue crystallized from a mixture of benzene and hexane to give 2,3-dihydro-5-(2-pyridyl) - 7 - trifluoromethyl-1H-1,4-benzodiazepine, melting at 181–183°.

Example 6

A solution of 2-bromochlorobenzene (105.3 g., 0.55 mole) in anhydrous ether (500 ml.) was converted to the Grignard reagent, by reaction with magnesium (13.38 g., 0.55 g.—atoms), under an atmosphere of dry nitrogen. Addition of 2-bromochlorobenzene required about 2 hours, during which time the ether refluxed gently, due to the heat of reaction. Formation of the Grignard reagent was completed by refluxing the mixture for an additional hour. The mixture was next stirred at room temperature during the dropwise addition of a solution of freshly distilled 2-cyanopyridine (52.0 g., 0.50 mole) in dry benzene (500 ml.), over ½–1 hour. The mixture was then stirred, and concentrated with heat in an oil bath. After half of the solvent was evaporated, the mixture was refluxed for 8 hours. It was thereafter cooled to 5–10° in an ice-water bath while carefully adding ice cold 3 N hydrochloric acid (500 ml.), with stirring. Stirring was continued for 2–3 hours at room temperature. The aqueous layer was separated, and the organic layer was extracted with 3 N hydrochloric acid (2× 250 ml.). The combined hydrochloric acid extracts were heated for 1 hour on a steam bath, under a reflux condenser, and were then cooled, made basic with 5 N sodium hydroxide solution, and extracted with ether. The ether extract was washed with water, dried over anhydrous sodium sulfate, and evaporated, to give the 2-(2-chlorobenzoyl)pyridine as a brown oil. The oil was purified by distillation from an oil bath (159–183°), at 0.35–0.20 mm. pressure. The yellow liquid distillate readily crystallized to a pale yellow crystalline mass of the product, M.P. 48–50°.

Example 7

A solution of 2-(2-chloro-5-nitrobenzoyl)pyridine (10.66 g., 40.6 millimoles) in a mixture of anhydrous pyridine (40 ml.) and ethylenediamine (13.6 ml., 203 millimoles) was refluxed for 5 hours. It was then concentrated in vacuo, and poured into water. The resulting yellow crystalline precipitate was filtered off. The cake was washed with water and refluxed with 1 N hydrochloric acid (100 ml.) for 3 hours. The solution was then cooled, diluted with water (150 ml.), and extracted with ether. The aqueous acid layer was made basic with 3 N sodium hydroxide solution and extracted with methylene chloride. Evaporation of the washed methylene chloride extract gave a yellow-brown crystalline residue which consisted mainly of 2-[2-(2-aminoethylamino)-5-nitrobenzoyl]pyridine. The residue was cyclized by refluxing with pyridine (50 ml.) for 3 hours, and then evaporated in vacuo. The resulting brownish crystalline residue was triturated with methylene chloride and water. A yellow crystalline product which formed was filtered off, and recrystallized from ethanol (required about 1 liter), to give 2,3-dihydro-7-nitro-5-(2-pyridyl)-1H-1,4-benzodiazepine.

Example 8

A solution of 2,3-dihydro-7-nitro-5-(2-pyridyl)-1H-1,4-benzodiazepine (1.70 g., 6.34 millimoles) in anhydrous N,N-dimethylformamide (17 ml.), was treated with sodium methoxide (0.38 g., 7.0 millimoles), and stirred for 1 hour at room temperature. The solution was then cooled in an ice bath while a mixture of dimethyl sulfate (0.88 g., 7.0 millimoles) and dimethylformamide (3 ml.) was carefully added over 15–20 minutes. Stirring was continued for 3 hours at room temperature, and then the mixture was poured into ice water, and stirred until the resulting precipitate crystallized. 2,3-dihydro-1-methyl-7-nitro-5-(2-pyridyl)-1H-1,4-benzodiazepine was filtered off, and dried, giving prisms, M.P. 175–177°. Recrystallizations from methylene chloride-hexane, and from 1:1 aqueous ethanol gave the product with a M.P. of 181–183°.

Example 9

To a solution of 4.6 g. of 2,3-dihydro-5-(2-pyridyl)-7-trifluoromethyl-1H-1,4-benzodiazepine in 50 ml. of N,N-dimethylformamide, 850 mg. of sodium hydride (53 percent in mineral oil) was added. After stirring for 45 min., 1.6 ml. of dimethyl-sulfate in 5 ml. of N,N-dimethylformamide was added slowly. The reaction became warm and was cooled to about 20° in a water bath. It was then stirred for 3 hrs. at room temperature, poured into 600–700 ml. of cold water, and extracted with ether. The ether layer was washed with water, dried over sodium sulfate and concentrated to dryness. The residue was added to a mixture of benzene and hexane. A crystalline material which formed after such addition was removed by filtration. The filtrate was concentrated to dryness in vacuo, dissolved in benzene and adsorbed on 60 g. of alumina. Elution with mixtures of benzene and methylene chloride gave 2,3-dihydro-1-methyl-5-(2-pyridyl)-7-trifluoromethyl-1H-1,4-benzodiazepine, which crystallized from hexane as light yellow rods melting at 127–129°.

Example 10

A solution of 37 g. of 2-(2-chloro-5-nitrobenzoyl)pyridine in 900 ml. of ethanolic ammonia (16 percent w./v.) was heated for 5 hrs. at 120–125°. The dark solution was concentrated to dryness in vacuo and the residue was crystallized from a mixture of benzene and hexane to give 2-(2-amino-5-nitrobenzoyl)pyridine melting at 150–153°. Further recrystallization raised the melting point to 156–158°.

Example 11

A mixture of 41 g. of 2-(2-chloro-5-trifluoromethylbenzoyl)pyridine in 300 ml. of dioxane and 300 ml. of concentrated ammonium hydroxide containing 5 g. of cuprous chloride was heated for 10 hrs. at 140° in an autoclave. The reaction mixture was concentrated to a small volume and partitioned between methylene chloride and water. The organic layer was dried over sodium sulfate and concentrated to dryness. The residue thus obtained was stirred in a two-phase system containing ether and 1 N hydrochloric acid for 1 hr. The ether layer was separated, washed with dilute sodium bicarbonate and water and dried over sodium sulfate. Ether was distilled off and the residue was dissolved in benzene and adsorbed on alumina. Elution with benzene and methylene chloride removed some impurities while elution with ether gave impure 2-(2-amino-5-trifluoromethylbenzoyl)pyridine as shown by thin layer chromatography. Further elution with a mixture of ether and ethyl acetate (95.5 percent) gave a fraction which on crystallization from hexane gave 2-(2-amino-5-trifluoromethylbenzoyl)pyridine melting at 89–92.5°. Recrystallization from hexane gave clusters of yellow plates melting at 91.5–93.5°.

Continued elution with ether-ethyl acetate (90:10) gave 2-(2-amino-5-cyanobenzoyl)pyridine which crystallized from benzene and hexane as yellow leaflets melting at 147–152°. Recrystallization from the same solvents raised the melting point to 153–5°.

Example 12

A suspension of 2,3-dihydro-1-methyl-7-nitro-5-(2-pyridyl)-1H-1,4-benzodiazepine (16.90 gm., 60.0 millimoles) in methanol (340 ml.) was hydrogenated at 24° and 754 mm. pressure, over an alcohol-washed Raney nickel catalyst (2 teaspoonsful, activity ca. W–2). Uptake of hydrogen ceased after 3–5 hours (2.7 mols.). The catalyst was filtered off on a bed of "Hyflo," washed with methanol, and discarded. The filtrate and the washings were combined, acidified with excess methanolic 2 N hydrogen chloride (100 ml.), and concentrated at <30°, in vacuo, to about 100 ml. Ether (7–8 volumes) was added to precipitate the crude hydrochloride, which was filtered off, and recrystallized from methanol-acetonitrile, giving dark-brown crystals. This was converted to the free base, by treatment with excess dilute sodium hydroxide solution. The base was extracted with methylene chloride. The extracts were washed with water, dried over anhydrous magnesium sulfate, and evaporated in vacuo, to give the crude product as a brown gum. This was dissolved in methylene chloride, and filtered through a short column containing "Woelm" neutral alumina, activity III (75 gm.). Evaporation of the eluates gave a slightly brownish yellow crystalline residue. Recrystallization from methylene chloride-hexane, benzene-hexane, and finally from methylene chloride-ether-petroleum ether (B.P. 40–60°) gave yellow prisms of 7-amino-2,3-dihydro - 1-methyl-5-(2-pyridyl)-1H-1,4-benzodiazepine, M.P. 165–167°.

Example 13

A solution of 7 - amino - 2,3-dihydro-1-methyl-5-(2-pyridyl)-1H-1,4-benzodiazepine (6.60 gm., 26.2 millimoles) in 3 N hydrochloric acid (54 ml., 162 milliequivalents) was swirled in a Dry Ice-ethanol bath at −5 to −10°, and treated dropwise with a solution of sodium nitrite (1.99 gm., 28.8 millimoles) in water (9 ml.), over 30–40 minutes. Towards the end of the reaction, the mixture was allowed to warm to +10°, and addition of sodium nitrite solution was continued until the starch-iodide reaction remained positive. The resulting diazonium chloride solution was then cooled to −10°, and added dropwise to a solution of cuprous chloride (5.74 gm., 58 millimoles) in a mixture of concentrated hydrochloric acid (25 ml., 290 milliequivalents) and water (12 ml.). The mixture was then diluted with water (100 ml.), heated in a water-bath at 35° (1 hr.), and then at 40° (1 hr.), until nitrogen-evolution ceased, and the diazo-test (R-salt) became negative. The reaction mixture was cooled to room temperature, made strongly basic with 28 percent aqueous ammonia, and extracted with methylene chloride. The extract was washed with water, dried over anhydrous magnesium sulfate, and evaporated, to give a dark-colored foam. This was extracted repeatedly with boiling benzene; the extracts were filtered to remove a tarry residue and were then chromatographed over a 25 x 210 mm. column of "Woelm" neutral alumina, activity III (100 gm.). Elution with methylene chloride, and evaporation of the eluates, gave a dark-colored, partly crystalline residue. This was partitioned between benzene and dilute hydrochloric acid. The aqueous acid layer was made basic with sodium hydroxide solution, and extracted with methylene chloride. The extract was washed with water, dried over anhydrous magnesium sulfate, and evaporated, to give a tan-colored crystalline residue. Recrystallization from benzene-hexane, and from ethanol, gave yellow prisms of 7-chloro-2,3-dihydro-1-methyl-5-(2-pyridyl)-1H-1,4-benzodiazepine, M.P. 152–154°.

Example 14

A solution of 700 mg. (2.6 mmoles) of 2,3-dihydro-7-nitro-5-(2-pyridyl)-1H-1,4-benzodiazepine in a mixture of 50 ml. of ethanol and 50 ml. of 6 N hydrochloric acid was heated to reflux for 5 hrs. The reaction mixture was then concentrated to dryness at reduced pressure, the residue dissolved in methanol and treated with charcoal. On addition of ether, yellow needles of 2-[2-(2-aminoethylamino)-5-nitrobenzoyl]pyridine hydrochloride crystallized. The compound charred slowly above 240°. The infrared spectrum (in KBr) showed a carbonyl band at 1645 cm.$^{-1}$ and salt bands at 2040 and 1065 cm.$^{-1}$.

We claim:
1. A compound of the formula

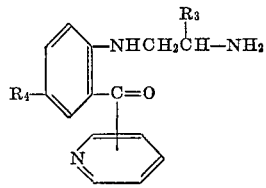

wherein $R_3$ is selected from the group consisting of hydrogen, and lower alkyl and $R_4$ is selected from the group consisting of hydrogen, halogen, trifluoromethyl, and nitro.

2. 2 - [2 - (2 - aminoethylamino) - 5 - trifluoromethylbenzoyl]pyridine.

3. 2-[2-(2-aminoethylamino)-5-nitrobenzoyl]pyridine.

References Cited

UNITED STATES PATENTS 3,131,178   4/1964   Archer et al. _____ 260—239

HENRY R. JILES, *Primary Examiner.*

A. L. ROTMAN, *Assistant Examiner.*

UNITED STATES PATENT OFFICE
CERTIFICATE OF CORRECTION

Patent No. 3,403,161 September 24, 1968

Rodney Ian Fryer et al.

It is certified that error appears in the above identified patent and that said Letters Patent are hereby corrected as shown below:

Column 1, line 26, "3,182,607" should read -- 3,182,067 --. Column 8, line 15, "1065" should read -- 1965 --; lines 28 and 29, after "trifluoromethyl" insert -- cyano --.

Signed and sealed this 3rd day of March 1970.

(SEAL)
Attest:

Edward M. Fletcher, Jr.

Attesting Officer

WILLIAM E. SCHUYLER, JR.

Commissioner of Patents